(12) United States Patent
Douglas

(10) Patent No.: US 12,387,515 B2
(45) Date of Patent: Aug. 12, 2025

(54) DOCUMENT AUTHENTICATION USING MULTI-TIER MACHINE LEARNING MODELS

(71) Applicant: Capital One Services, LLC, McLean, VA (US)

(72) Inventor: Lawrence Douglas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 397 days.

(21) Appl. No.: 17/809,920

(22) Filed: Jun. 30, 2022

(65) Prior Publication Data
US 2024/0005688 A1    Jan. 4, 2024

(51) Int. Cl.
*G06V 30/413*    (2022.01)
*G06T 7/00*      (2017.01)
*G06V 20/00*     (2022.01)
*G06V 30/418*    (2022.01)

(52) U.S. Cl.
CPC .......... *G06V 30/413* (2022.01); *G06T 7/0002* (2013.01); *G06V 20/95* (2022.01); *G06V 30/418* (2022.01); *G06T 2207/20081* (2013.01)

(58) Field of Classification Search
None
See application file for complete search history.

(56) References Cited

U.S. PATENT DOCUMENTS

| | | | |
|---|---|---|---|
| 2009/0152357 A1* | 6/2009 | Lei | G06Q 50/18 235/454 |
| 2015/0002915 A1* | 1/2015 | Lebaschi | H04N 1/484 358/538 |
| 2015/0278487 A1* | 10/2015 | Scott | H04L 9/3239 726/28 |
| 2016/0364936 A1* | 12/2016 | Gao | G06V 30/2504 |
| 2021/0004581 A1* | 1/2021 | Bathory-Frota | G06V 30/413 |
| 2022/0188598 A1* | 6/2022 | Gu | G06F 21/32 |
| 2022/0261494 A1* | 8/2022 | Truong | G06V 20/62 |
| 2022/0262150 A1* | 8/2022 | Pic | G06V 30/245 |
| 2022/0318597 A1* | 10/2022 | Yu | G06F 21/34 |
| 2023/0005122 A1* | 1/2023 | Peng | G06V 10/758 |
| 2023/0084625 A1* | 3/2023 | Mori | G06V 10/98 382/118 |

(Continued)

Primary Examiner — Michelle M Entezari Hausmann
(74) Attorney, Agent, or Firm — Foley & Lardner LLP

(57) ABSTRACT

Methods and systems are described herein for providing multi-tier machine learning model processing for document authenticity. A document authentication system built based on the current disclosure may rely on a camera to capture an image of a document and use a multi-tiered machine learning infrastructure to identify security features associated with the image of the document and determine based on those features whether the document is authentic. Furthermore, using the disclosed methods and system enable the provider of the machine learning model to improve the document authentication system by training the multi-tier machine learning model based on millions of interactions collected as part of processing. In addition, the document authentication system enables tracking where/when particular instances of documents are scanned. Based on the tracking, the document authentication system may further identify instances of documents that are not authentic.

20 Claims, 7 Drawing Sheets

(56) References Cited

U.S. PATENT DOCUMENTS

2023/0120865 A1\* 4/2023 Nascimento ......... G06V 30/418
705/44
2023/0281820 A1\* 9/2023 Pizzocchero ........ G06V 10/245
382/100

\* cited by examiner

| Version Identifier | Security Features | Threshold |
|---|---|---|
| Doc1_Version 1 | Security feature 1<br>Security feature 2<br>Security feature 3 | 90 |
| Doc1_Version 2 | Security feature 1<br>Security feature 4<br>Security feature 5 | 80 |
| Doc1_Version 3 | Security feature 3<br>Security feature 5<br>Security feature 6 | 55 |
| Doc2_Version 1 | Security feature 3<br>Security feature 5<br>Security feature 6 | 75 |

FIG. 2

DOCUMENT AUTHENTICATION USING MULTI-TIER MACHINE LEARNING MODELS

BACKGROUND

Item authentication has been performed for many years. In many cases, experts examine items (e.g., paintings, vases, sculptures) to determine whether a particular item is authentic. With increasing use of documents (e.g., deeds, financial instruments, etc.) for various purposes, document authentication has become even more important. Furthermore, to make document authentication easier, many documents are now generated with security measures to enable easier authentication and to make these documents harder to fake. Generally, authenticating documents is done by an expert that uses special tools (e.g., microscopes, mass spectrometers, etc.) to determine whether an item (e.g., a document) is authentic. Currently, specialty devices exist to determine whether a document is authentic. Those specialty devices generally have to be programmed to scan for specific security measures that each document is equipped with. Thus, those devices are generally difficult to adapt to different documents and in addition may be difficult to source.

SUMMARY

Therefore, methods and systems are described herein for providing multi-tier machine learning model processing for document authenticity. A document authentication system built based on the current disclosure may only need to rely on a camera within a computing device to perform its functions. As cameras and hand-held computing devices have become ubiquitous in our society, the document authentication system may be set up on any camera-enabled device including a smart phone, an electronic tablet, a laptop computer, or other suitable camera-enabled devices. Furthermore, the disclosed methods and systems may enable the provider to improve the document authentication system by training the multi-tier machine learning model based on millions of interactions collected as part of processing. In addition, the document authentication system enables tracking where/when particular instances of documents are scanned. Based on the tracking, the document authentication system may further identify instances of documents that are not authentic.

When the system is initiated, the document authentication system may receive an image representing an instance of a document. In some embodiments, the document may have a plurality of versions with each version including a corresponding plurality of security features for authenticating the document. For example, the system may be configured to authenticate trading cards (e.g., baseball cards, hockey cards, or other trading cards). There may be thousands of different trading cards with different versions (e.g., one player having a different version of the trading card each year and hundreds or thousands of trading cards created for that player each year).

In some embodiments, a person wishing to authenticate a document (e.g., a trading card) may open an application on a smart phone to initiate the application and capture an image of a document (e.g., particular trading card) using a built-in camera. The document authentication system may receive the image of the document from the camera and input the image into a machine learning model. The machine learning model may be trained to determine security features associated with a version of a received document (e.g., security measures associated with trading cards created during a particular year). Based on the security features, the machine learning model may determine whether the received image (e.g., the image of the trading card) represents an authentic document.

In some embodiments, the machine learning model may be a multi-tier machine learning model including a tier for identifying security features and a tier for determining whether the instance of a document is authentic. In some embodiments, however, the document authentication system may use two machine learning models. The first machine learning model may identify a version of the document, and the second machine learning model or the document authentication system may identify security features corresponding to the determined version. The second machine learning model may then determine, based on those security features, whether the instance of the document is authentic.

The document authentication system may receive, from the machine learning model based on inputting the image, a probability that the image represents an authentic instance of the document. The probability may be a score or another suitable indicator. The document authentication system may then determine whether the probability that the image represents the authentic instance of the document meets a threshold. For example, the system may be configured with a threshold of 90%, 80%, 60%, etc. as a cutoff (threshold) for determining that the instance of the document is authentic. The threshold may be automatically adjusted based on user input as a user may determine that an image of a particular instance of the document is authentic in spite of the document authentication system assigning a probability of less than the threshold.

Based on determining that the probability that the image represents the authentic instance of the document meets the threshold, the document authentication system may provide, to a user, an indication that the instance of the document is authentic. For example, the document authentication system may generate a display on the mobile device an indication that the trading card is authentic. In some embodiments, based on determining that the probability that the image represents the authentic instance of the document does not meet the threshold, the document authentication system may provide, to the user, indications of one or more security features associated with the version of the document. In addition, the document authentication system may provide instructions, to the user, for authenticating the instance of the document using the one or more security features.

Furthermore, the document authentication system may perform other operations to determine whether an instance of the document that is below or close to the threshold is authentic. For example, the document authentication system may generate a document token from an image of the instance of the document and compare the document token to other tokens (e.g., stored in the database). If an identical token is found (e.g., within the database), the document authentication system may determine when and/or where the token was detected. Based on the location and time associated with detection of the token (as stored in the database), the document authentication system may determine whether the document token is authentic. For example, an image of a particular trading card may be encoded into a token which is unique to that instance. Based on determining that the instance of that token was last detected ten minutes prior ten thousand miles away, the document authentication system may determine that the version of the document associated with the image is not authentic.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a data structure storing security features and thresholds for different versions of documents, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
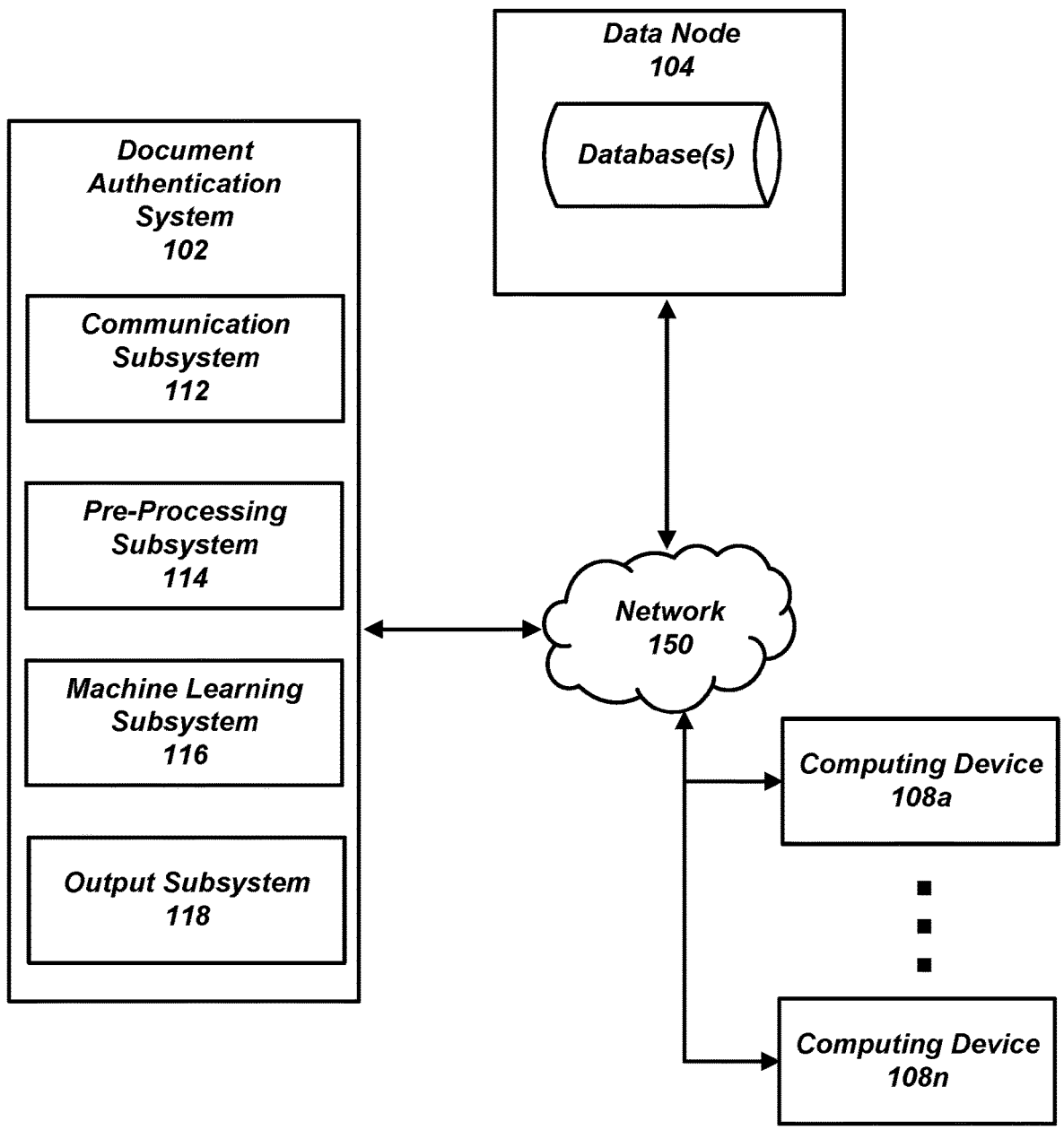
FIG. 1 shows an illustrative system for providing multi-tier machine learning model processing for document authenticity, in accordance with one or more embodiments of this disclosure.

FIG. 1 is an example of environment 100 for providing multi-tier machine learning model processing for document authenticity. Environment 100 includes document authentication system 102, data node 104, and computing devices 108a-108n. Document authentication system 102 may execute instructions for providing multi-tier machine learning model processing for document authenticity. Document authentication system 102 may include software, hardware, or a combination of the two. For example, document authentication system 102 may reside on a server device, on a client device, or on a combination of both. In some embodiments, although shown separately, document authentication system 102 may reside on one or more computing devices 108a-108n.

Data node 104 may store various data. For example, data node 104 may be a repository for one or more machine learning models. In some embodiments, data node 104 may also be used to train and/or tweak machine learning models and may store training datasets and updates. Thus, data node 104 may host a database for storing that data. Data node 104 may include software, hardware, or a combination of the two. For example, data node 104 may be a physical server, or a virtual server that is running on a physical computer system. In some embodiments, data node 104 may reside in a datacenter. Network 150 may be a local area network, a wide area network (e.g., the Internet), or a combination of the two. Computing devices 108a-108n may be end-user computing devices (e.g., laptops, electronic tablets, smart phones, and/or other computing devices used by end users). Computing devices 108a-108n may include one or more cameras and/or other image capturing devices.

Document authentication system 102 may receive an image representing an instance of a document. The document may be associated with a plurality of versions, and each version may include a corresponding plurality of security features for authenticating the document. Document authentication system 102 may receive the image using communication subsystem 112. Communication subsystem 112 may include software components, hardware components, or a combination of both. For example, communication subsystem 112 may include a network card (e.g., a wireless network card/processor) that is coupled with software to drive the card/processor. The network card may be built into a server or another device hosting document authentication system 102. In some embodiments, document authentication system 102 may receive the image from a computing device of computing devices 108-108n. The image may be a monetary instrument (e.g., a paper bill, government bond, or another suitable monetary instrument). Thus, there may be many versions of the monetary instrument including different denominations and different versions printed during different years. Each of those versions may have different associated security features.

In some embodiments, document authentication system 102 may reside on a computing device 108 and may receive the image from a camera or another image capturing device. Communication subsystem 112 may pass the image or a pointer to the image in memory, to pre-processing subsystem 114.

Pre-processing subsystem 114 may include software components, hardware components, or a combination of both. Pre-processing subsystem 114 may perform various pre-processing tasks before the image is ready to be input into one or more machine learning models. For example, pre-processing subsystem 114 may generate one or more vector representations for the image. In some embodiments, pre-processing subsystem 114 may generate one or more tokens representing the image. The tokens may then be used to determine whether the particular instance of the document has been encountered before by comparing the token with other tokens (e.g., stored in a database). Pre-processing subsystem 114 may pass the preprocessed image and/or additional information to machine learning sub system 116.

Machine learning subsystem 116 may receive the preprocessed image and/or any additional information from pre-processing subsystem 114. Machine learning subsystem 116 may include software components, hardware components, or a combination of both. For example, machine learning subsystem 116 may include software components that access data in memory and/or storage, and may use one or more processors to perform its operations. Machine learning subsystem 116 may input the image into a machine learning model. The machine learning model may have been trained to determine a plurality of security features associated with a version of a received document and, based on the plurality of security features, may determine whether the received image represents an authentic document.

In some embodiments, the machine learning model may be a two-tier machine learning model. The first tier of the machine learning model may have been trained to determine security features associated with a document. In some embodiments, the training may be supervised training, where a plurality of images of documents may be input into a training routine of the machine learning model. Each image may be accompanied with a label indicating a version of the document. For example, a plurality of paper bills may be scanned or imaged and a version number may be assigned to each bill (e.g., based on the year produced or version of the bill).

In some embodiments, the first tier of the machine learning model may use unsupervised learning. For example, a plurality of documents of different versions (e.g., different paper bills) may be input into the machine learning model and the machine learning model may determine (e.g., through clustering) a plurality of versions for the document. The machine learning model may then determine which security features are associated with a particular version of the document. The machine learning model may perform this operation based on data structure 200 illustrated in FIG. 2. Data structure 200 may be a table or another suitable data structure that includes a plurality of fields. Column 203 represents a version identifier associated with each version of a particular document. Thus, when the machine learning model determines the document and version identifiers for the image, the machine learning model may determine based on the table of FIG. 2 or another suitable data structure which security features the instance of the document includes. The machine learning model may then adjust parameters of the second tier of the machine learning model based on the identified security features.

Column 206 may include identifiers of various security features associated with each version of each document. Those security features may be areas on the document where a particular security feature is located. In some embodiments, column 206 may include vector representations of authentic security features and/or non-authentic security features and a location of each security feature on the document. Column 209 may store thresholds for determining whether each security feature is authentic. For example, some document versions may be older and thus may have higher thresholds for authenticity because a lot more instances of the documents are available for training and/or updating the training. However, other document versions may be newer without much training data. Thus, those document versions may have lower thresholds for authenticity.

The second tier of the machine learning model may then be executed against the identified security features to determine whether the document is authentic. For example, the machine learning model may use the image or the image as it was preprocessed together with parameters identifying the security features to determine whether the instance of the document is authentic.

In some embodiments, the two-tier machine learning model may first identify security features associated with the instance of the document. For example, the first tier of the machine learning model may be trained to identify security features directly, without first identifying a version of the document. That is, the training routine may take as input a plurality of documents labelled as authentic and indications of their corresponding security features (e.g., indications of the areas where the security features are shown). In addition, the training routine may take as input a plurality of documents labelled as non-authentic and corresponding security features where those security features may be labelled as passing an authenticity test or failing the authenticity test. The machine learning model may then learn based on that input the security features and their authenticity characteristics.

In some embodiments, document authentication system 102 may use multiple machine learning models instead of a single multi-tier machine learning model. For example, machine learning subsystem 116 may input the image into a first machine learning model to obtain a version identifier associated with the instance of the document from the first machine learning model. The first machine learning model may have been trained to identify a version of the plurality of versions associated with the instance of the document. Machine learning subsystem 116 may receive a version identifier from the first machine learning model and then identify one or more security features for the version, for example, via data structure 200 of FIG. 2. As discussed above, in some embodiments, the first machine learning model may output the detected security features without determining a version associated with the instance of the document. In that case, data structure 200 may not be needed to determine security features.

Machine learning subsystem 116 may then input the image and the version identifier into a second machine learning model. The second machine learning model may have been trained to determine, based on security features associated with the version of the document, whether the instance of the document is authentic. For example, the second machine learning model may adjust its detection parameters based on the version of the document. In some embodiments, the second machine learning model may receive as input indications of security features that were identified by the first machine learning model, for example, instead of a version identifier. Thus, the second machine learning model may have been trained using a dataset that includes images of documents and corresponding security features (e.g., indications of areas on the document where each security feature is located). Each security feature may have also had a label of authentic or not authentic. Thus, the second machine learning model may have been trained to identify authentic and non-authentic security features.

Figure 3:
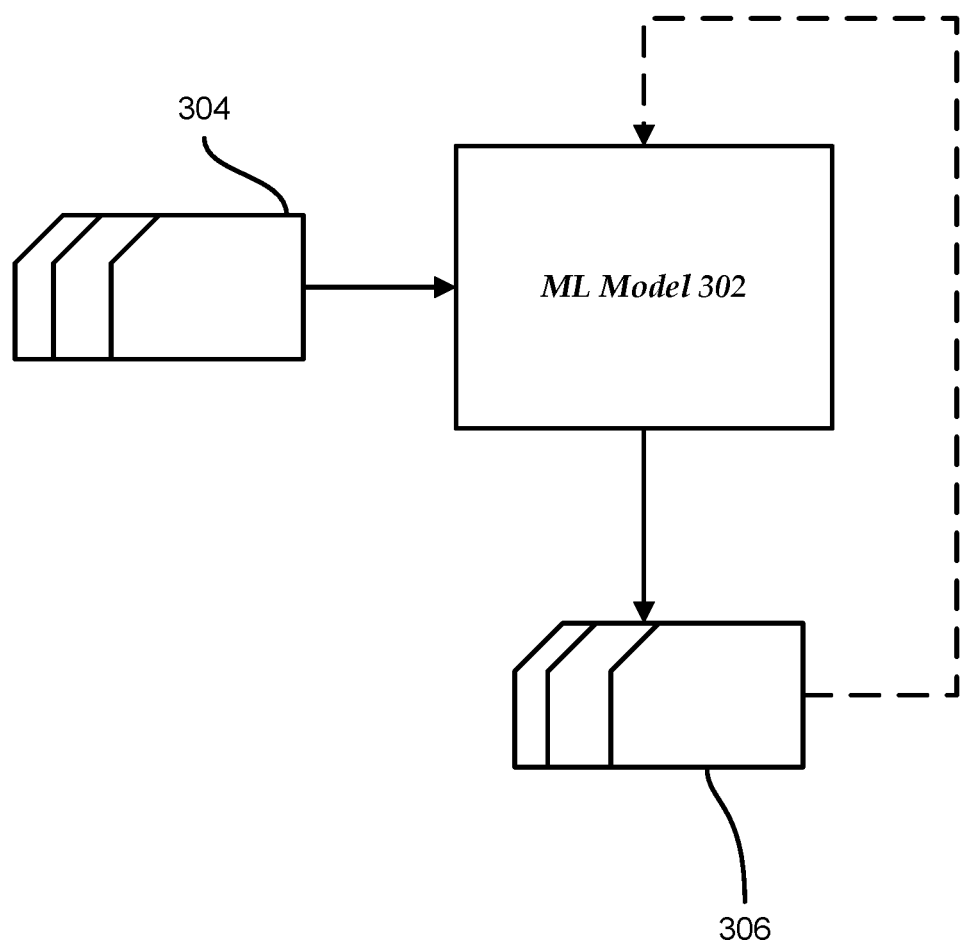
FIG. 3 illustrates an exemplary machine learning model, in accordance with one or more embodiments of this disclosure.

The machine learning models, or tiers of a single machine learning model described above, may take many forms. In some embodiments, these machine learning models and/or algorithms may be used by machine learning subsystem 116 with an application programming interface. FIG. 3 illustrates an exemplary machine learning model or a tier of a machine learning model. For the purpose of FIG. 3, a machine learning model and a tier of a machine learning model may be interchangeable. Machine learning model 302 may take input 304 (e.g., an image) and may generate output 306. In some embodiments, the input may be a version number of a document, or a plurality of security features associated with the document. The plurality of security features may be tokens or vectors indicating the security features and location of those security features on the document. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Machine learning subsystem 116 may receive, from the machine learning model based on inputting the image, a probability that the image represents an authentic instance of the document. In some embodiments, the probability may be a percentage while in other embodiments the probability may be a number between zero and one or another suitable value. Machine learning subsystem 116 may determine whether the probability that the image represents the authentic instance of the document meets a threshold. In some embodiments, the threshold may be a static value added to the system by an operator. Thus, machine learning subsystem 116 may retrieve the threshold and compare the threshold with the probability returned by the machine learning model.

In some embodiments, the threshold may be different for different documents or versions of the document. For example, machine learning subsystem 116 may retrieve the threshold from a data structure illustrated in FIG. 2 (column 209). Thus, machine learning subsystem 116 may determine (e.g., via the machine learning model) a version identifier associated with the instance of the document and perform a lookup within data structure 200 for a corresponding threshold value. In some embodiments, the threshold value may be adjusted based on training the machine learning model and accuracy of the machine learning model. For example, when the machine learning model outputs a probability value, the machine learning model may also output a residual value for the prediction. Thus, machine learning subsystem 116 may adjust the threshold based on the residual value. The higher the residual value, the lower the threshold may be adjusted. In some embodiments, the threshold may be adjust based on residual value change between model executions. Thus, machine learning subsystem 116 may determine a percentage change within residual values and adjust the threshold by calculating a new threshold based on a current threshold and a percentage change.

In some embodiments, the threshold may be determined based on a version of the document. For example, newer versions of documents may have lower thresholds as there may be less training data for those versions, while older versions of the documents may have higher threshold values because there may be more training data enabling better detection of authentic/non-authentic documents.

Based on determining that the probability that the image represents the authentic instance of the document meets the threshold, output subsystem 118 may provide to a user, an indication that the instance of the document is authentic. For example, machine learning subsystem 116 may pass the determination to output subsystem 118. Output subsystem 118 may receive the determination and generate a display to inform the user that the instance of the document is authentic. Output subsystem 118 may include software components, hardware components, or a combination of both. For example, output subsystem 118 may include software components that access data in memory and/or storage, and may use one or more processors to perform its operations. In some embodiments, output subsystem 118 may generate a display to be output on a display device. For example, the display may indicate that the document is authentic. In the embodiments where the document authentication system is hosted on a device with a display (e.g., a mobile device), output subsystem 118 may output the generated display to the screen of the device. In some embodiments, output subsystem 118 may transmit (e.g., using communication subsystem 112) the display or an indication that the instance of the document is authentic to a user device (e.g., any computing device 108a-108n).

Figure 4:
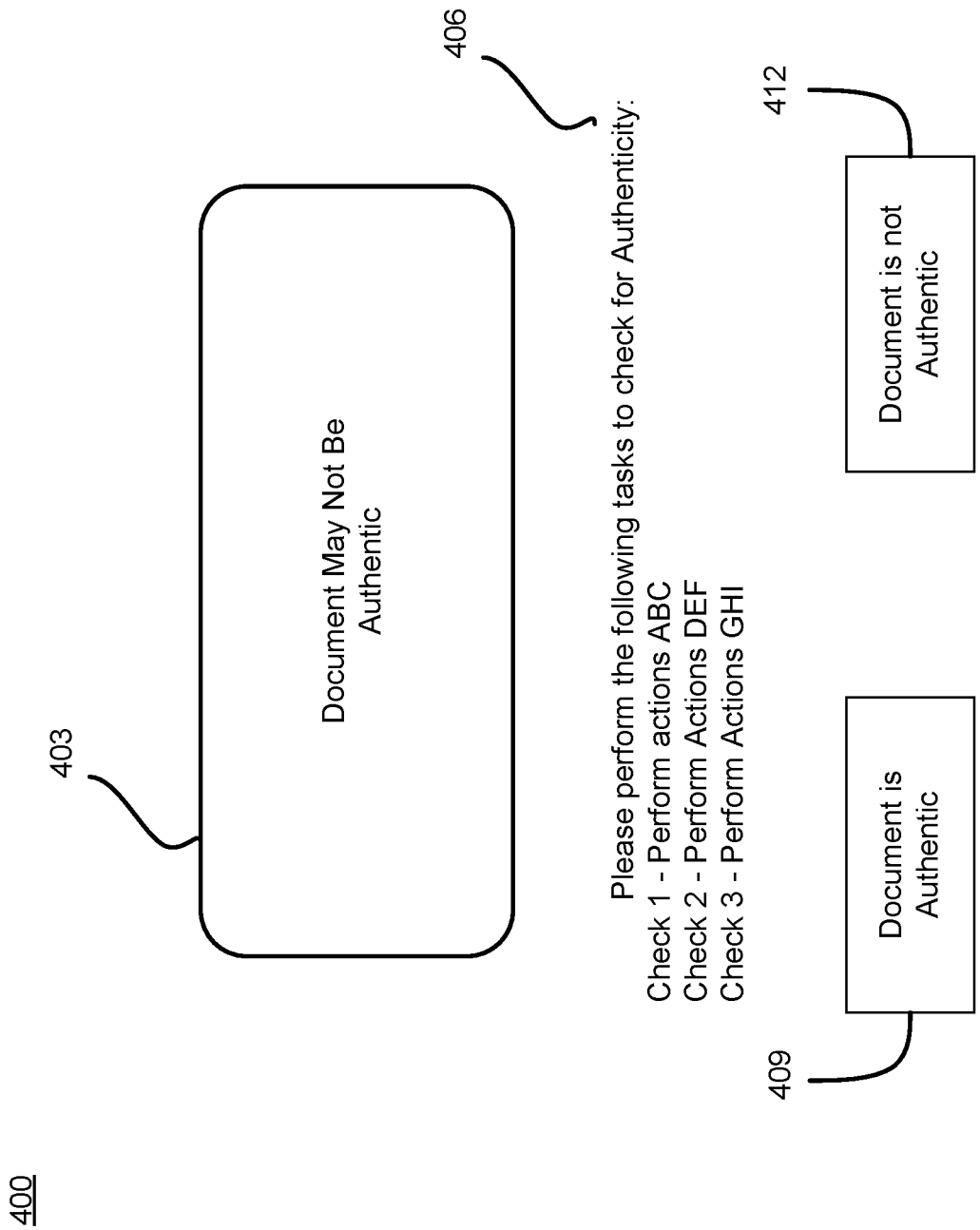
FIG. 4 illustrates a display, in accordance with one or more embodiments of this disclosure.

In some embodiments, based on determining that the probability that the image represents the authentic instance of the document does not meet the threshold, output subsystem 118 may provide, to the user, indications of one or more security features associated with the version of the document. Additionally or alternatively, output subsystem 118 may provide instructions for authenticating the instance of the document using the one or more security features. For example, output subsystem 118 may output display 400 of FIG. 4. Display 400 may have an indication of the instance of the document 403. Indication of the instance of the document 403 may be the image or may be another suitable indication. Display 400 may also indicate that the document may not be authentic.

Furthermore, display 400 may display area 406 instructing the user how to manually check whether the document is authentic. Each instruction may be associated with a particular security feature. In some embodiments, area 406 may indicate which security features were authentic and which were not and only display instructions for manually checking those security features that were not detected as authentic. Additionally display 400 may include an interactive indicator 409 and an interactive indicator 412. When the user manually checks the document for authenticity, the user is enabled to select interactive indicator 409 or interactive indicator 412 based on whether the instance of the document is deemed authentic or non-authentic.

In some embodiments, the user may determine that the document is authentic in spite of the document authentication system determining that probability output by a machine learning model does not meet the threshold. In those embodiments, the user may select interactive indicator 409. In this instance, output subsystem 118 may pass this information with accompanying data (e.g., the image, the probabilities and/or other information) to a training routine of the machine learning model (or the training routine of a second tier of the machine learning model). Thus, based on receiving the input that the document is authentic while the document authentication system determined that the document is not authentic (e.g., based on the threshold), the document authentication system may initiate a training routine of the machine learning model. The initiating operation may include inputting the image into the machine learning model with a label indicating that the document is authentic. In some embodiments, based on the document authentication system determining that the probability does not meet the threshold, the document authentication system may adjust the threshold to be a lower value (e.g., based on a percentage difference between the threshold and the probability).

If the user determines that the document is not authentic, the user is enabled to select interactive indicator 412. In these instances, the document authentication system may initiate a training routine to train the machine learning model based on the document authentication system being correct.

In some embodiments, the document authentication system may further determine that an instance of the document is not authentic based on the instance of the document being detected by the document authentication system a threshold number of times in the past. In some embodiments, this process may be executed by the document authentication system when probability is within a certain value of the threshold (e.g., within 10%, within 5% etc.). For example, this process may be used to authenticate financial instruments (e.g., bonds, paper bills, etc.) where each financial instrument has a unique identifier (e.g., serial number). For example, one of the security features of an instance of the document may be a serial number. Thus, the document authentication system may access an identifier (e.g., a serial number or another unique identifier) associated with the instance of the document.

Document authentication system 102 may then compare the identifier with a plurality of identifiers corresponding to a plurality of images associated with a plurality of instances of the document. For example, the document authentication system may store an image or one or more tokens representing a particular instance of the document encountered in the past. For example, each document may have a unique identifier as the token and other tokens associated with various areas of the document. Thus, if a document (e.g., a bill having a particular serial number) has been encountered a certain number of times in the past where the token representing a unique identifier matches, but other tokens do not match, document authentication system 102 may store that information. In some embodiments, each token may be associated with a particular security feature (e.g., an image of that security feature) associated with the document. One of those security features may be a unique identifier (e.g., a serial number). Thus, document authentication system 102 may determine whether that identifier may have been encountered before.

Thus, document authentication system 102 may determine, based on comparing the identifier with the plurality of identifiers (e.g., within a database), that the identifier matches a threshold number of instances of the document. For example, document authentication system 102 may determine that the unique identifier matches one or more other unique identifiers in the database and that tokens other than the identifier do not match. Thus, the threshold may be one or more. For example, if the serial numbers of two bills match, but other tokens (e.g., security features) do not match, document authentication system 102 may determine that one of the bills is non-authentic. Thus, based on determining that the identifier matches the threshold number of instances of the document, document authentication system 102 may determine that the instance of the document is not authentic.

In some embodiments, document authentication system 102 may determine that a particular document is not authentic when the instance of the document is encountered with a threshold time period, but in different locations such that it would be impossible to travel from one location where the instance of the document has been encountered to the other location where the instance of the document has been encountered within the time that the two instances were detected. This process may be performed based on determining that the probability that the image represents the authentic instance of the document does not meet the threshold. For example, document authentication system 102 may perform operations of this method when the probability is within a particular value of the threshold (e.g., below the threshold or above the threshold).

Document authentication system 102 may generate, from the image, a token representing the instance of the document. As discussed above, the token may be a serial number of the document. In some embodiments, document authentication system 102 may generate multiple tokens for the instance of the document. Each token may be a representation of a particular security feature associated with the document, and each token may be stored in a database in association with an identifier of the instance of the document. Furthermore, the database may store one or more locations and times when the associated instance of the document was detected.

Document authentication system 102 may determine that the token matches a stored token representing another instance of the document. As discussed above, the stored token may be associated with a detection location and a detection time representing the time and location where the instance of the document was detected. Based on determining that the detection location is not within a location threshold of a current location or the detection time is not within a time threshold of a current time, document authentication system 102 may determine that the instance of the document is not authentic. Furthermore, document authentication system 102 may update a record associated with the token to indicate a detected location and detected time associated with detection of the token. Thus, document authentication system 102 may keep the database of instances of documents detected up to date.

Figure 5:
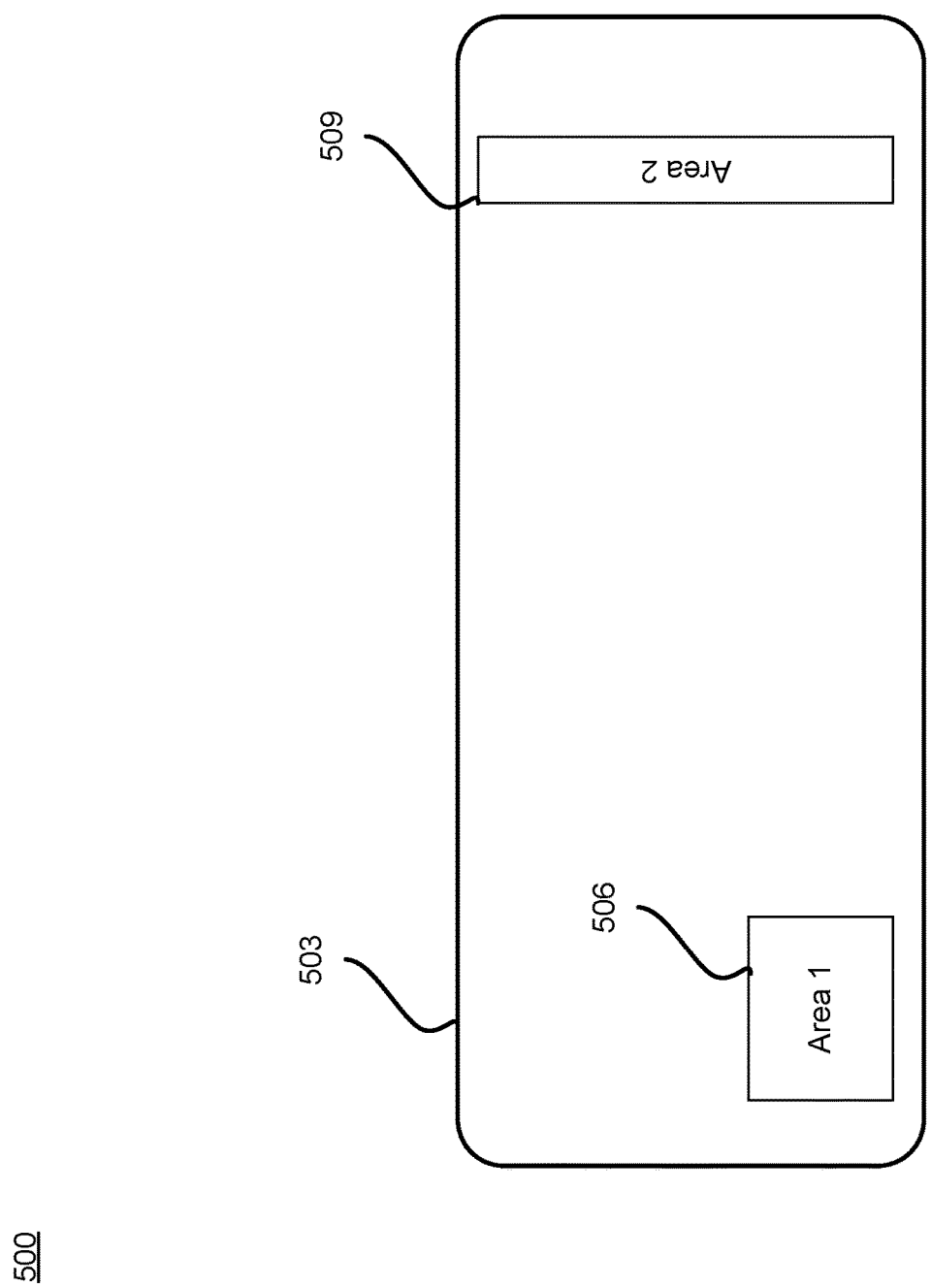
FIG. 5 illustrates another display, in accordance with one or more embodiments of this disclosure.

In some embodiments, the machine learning model outputting the probability that an instance of the document is authentic may output areas of the document that contributed to lowering the probability. The areas may be output as sets of coordinates. This output may enable a user to manually check the identified areas of the document. FIG. 5 illustrates how output subsystem 118 may output the areas. Output subsystem 118 may output a representation of the instance of the document 503. The image may be the image of the document or a simulated image. Furthermore, output subsystem 118 may output area 506 and area 509 indicating which areas caused the probability to be lowered. Thus, output subsystem 118 may receive, from the machine learning model or from machine learning subsystem 118, one or more indications of one or more areas on the image that contributed to lowering the probability that the instance of the document is authentic and generate for display the image of the document with the one or more areas highlighted to the user.

Computing Environment

Figure 6:
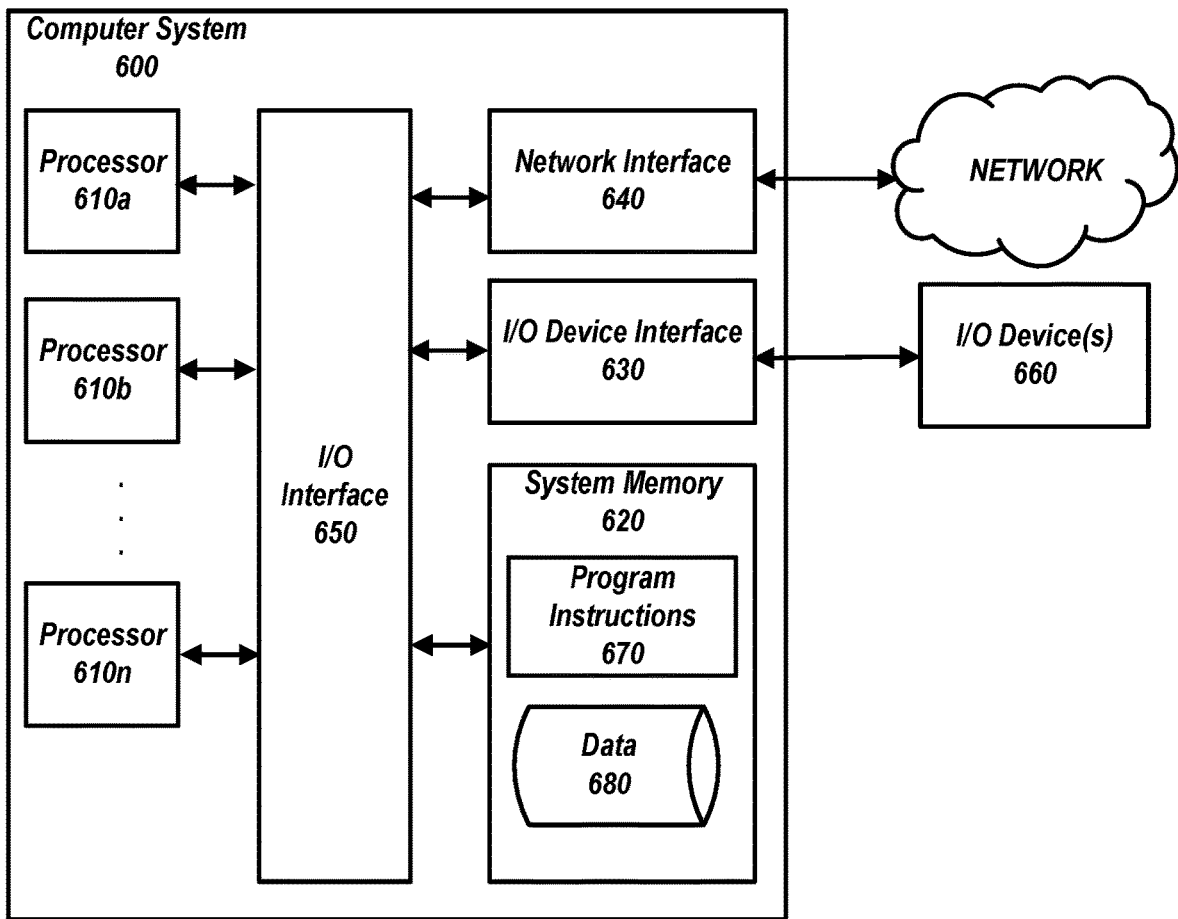
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system. The computing system may be hosted on an unmanned vehicle, a controller or another suitable device. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage media may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
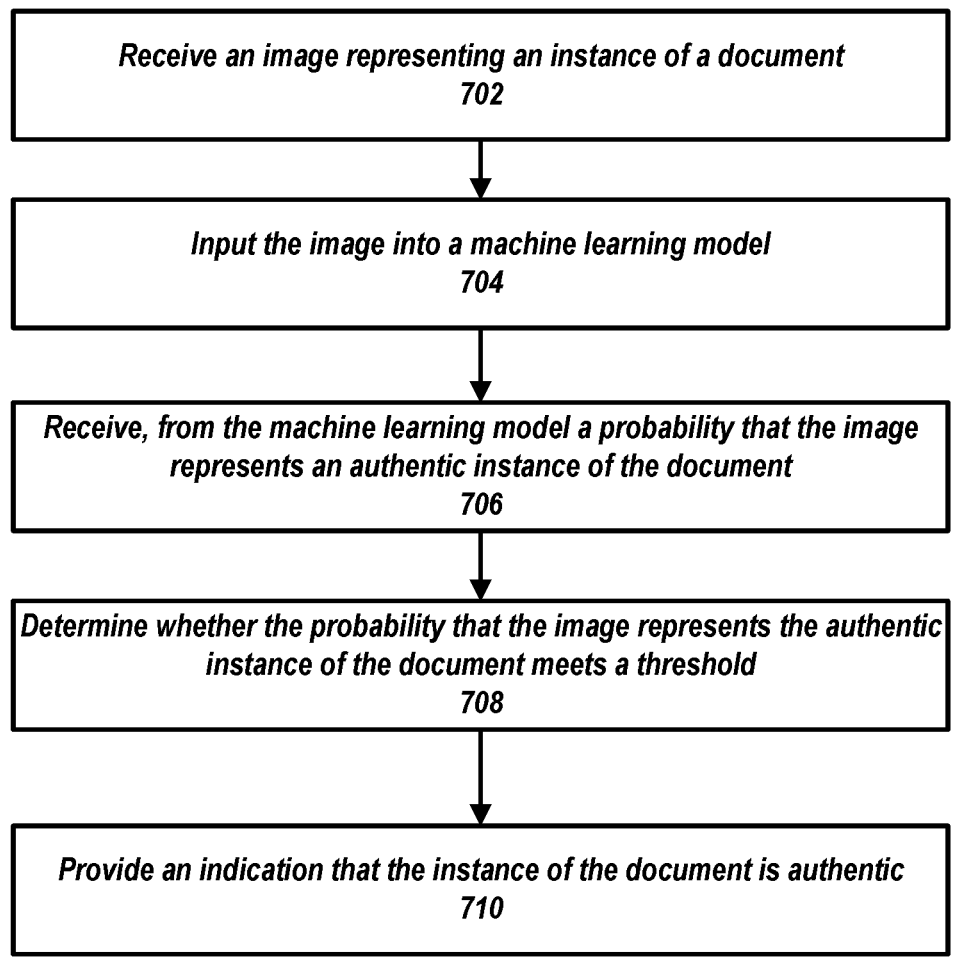
FIG. 7 is a flowchart of operations for generating composite frames that include object identifiers determined based on multi-machine learning model processing, in accordance with one or more embodiments of this disclosure.

FIG. 7 is a flowchart 700 of operations for providing multi-tier machine learning model processing for document authenticity. The operations of FIG. 7 may use components described in relation to FIG. 6. In some embodiments, document authentication system 102 may include one or more components of computing system 600. At 702, document authentication system 102 receives an image representing an instance of a document. For example, the document authentication system may receive the image from a camera through a bus shared between the camera and the document authentication system 102 or over network 150 using network interface 640.

At 704, document authentication system 102 inputs the image into a machine learning model. For example, document authentication system 102 may use one or more processors 610a-610n to perform the operation using an application programming interface associated with the machine learning model. At 706, document authentication system 102 receives, from the machine learning model, a probability that the image represents an authentic instance of the document. For example, the machine learning model may be hosted on the same computing device as document authentication system 102. Thus, document authentication system 102 may receive the probability through I/O Interface 650 or through another suitable bus. In some embodiments, the machine learning model may be hosted on a computing device different from where document authentication system 102 is hosted. Thus, document authentication system 102 may receive the probability via network 150 through network interface 640.

At 708, document authentication system 102 determines whether the probability that the image represents the authentic instance of the document meets a threshold. Document authentication system 102 may use one or more processors 610a, 610b, and/or 610n to perform the determination. At 710, document authentication system 102 provides an indication that the instance of the document is authentic. For example, document authentication system 102 may generate for display a display screen to be displayed on a computing device that the document is authentic. In some embodiments, document authentication system 102 may transmit the indication to a computing device (e.g., to one or more computing devices 108a-108n) through network 150 using network interface 640.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing multi-tier machine learning model processing for document authenticity, the method comprising: receiving an image representing an instance of a document, wherein the document is associated with a plurality of versions and wherein each version comprises a corresponding plurality of security features for authenticating the document; inputting the image into a machine learning model, wherein the machine learning model is trained to (1) determine a plurality of security features associated with a version of a received document and, (2) based on the plurality of security features, determine whether the received image represents an authentic document; receiving, from the machine learning model based on inputting the image, a probability that the image represents an authentic instance of the document; determining whether the probability that the image represents the authentic instance of the document meets a threshold; and based on determining that the probability that the image represents the authentic instance of the document meets the threshold, providing, to a user, an indication that the instance of the document is authentic.

2. Any of the preceding embodiments, further comprising, based on determining that the probability that the image represents the authentic instance of the document does not meet the threshold, providing, to the user, indications of one or more security features associated with the version of the document and instructions for authenticating the instance of the document using the one or more security features.

3. Any of the preceding embodiments, further comprising: receiving an input from the user that the document is authentic; and based on receiving the input, initiating a training routine of the machine learning model, wherein the initiating comprises inputting the image into the machine learning model with a label indicating that the document is authentic.

4. Any of the preceding embodiments, wherein the machine learning model is configured to perform operations comprising: identifying a version of the plurality of versions associated with the instance of the document; and based on security features associated with the version of the document, determining the probability that the instance of the document is authentic.

5. Any of the preceding embodiments, further comprising: based on determining that the probability that the image represents the authentic instance of the document does not meet the threshold: accessing an identifier associated with the instance of the document; comparing the identifier with a plurality of identifiers corresponding to a plurality of images associated with a plurality of instances of the document; determining, based on the comparing, that the identifier matches a threshold number of instances of the document; and based on determining that the identifier matches the threshold number of instances of the document, determining that the instance of the document is not authentic.

6. Any of the proceeding embodiments, further comprising: based on determining that the probability that the image represents the authentic instance of the document does not meet the threshold: generating, from the image, a token representing the instance of the document; determining that the token matches a stored token representing another instance of the document, wherein the stored token is associated with a detection location and a detection time; and based on determining that the detection location is not within a location threshold of a current location or the detection time is not within a time threshold of a current time, determining that the instance of the document is not authentic.

7. Any of the preceding embodiments, further comprising updating a record associated with the token to indicate a detected location and detected time associated with detection of the token.

8. Any of the preceding embodiments, further comprising: receiving, from the machine learning model, one or more indications of one or more areas on the image that contributed to lowering the probability that the instance of the document is authentic; and generating for display the image of the document with the one or more areas highlighted to the user.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for providing multi-tier machine learning model processing for document authenticity, the system comprising:
   one or more processors; and
   a non-transitory, computer-readable storage medium storing instructions, which when executed by the one or more processors cause the one or more processors to perform operations comprising:
     receiving an image representing an instance of a document,
       wherein the document is associated with a plurality of versions of the document,
       wherein the plurality of versions of the document include:
         a first version associated with a first plurality of security features for authenticating the document, and
         a second version associated with a second plurality of security features for authenticating, and
       wherein the second plurality of security features are different from the first plurality of security features;
     inputting the image into a machine learning model that is trained to (1) determine, using a first tier of the machine learning model, a subset of the first plurality of security features which the instance of the document includes, (2) adjust parameters of a second tier of the machine learning model based on the subset of the first plurality of security features, and (3) determine, using the second tier of the machine learning model, whether the received image represents an authentic document;
     receiving, from the machine learning model and based on inputting the image, a probability that the image represents an authentic instance of the document;
     determining whether the probability that the image represents the authentic instance of the document meets a threshold;
     based on determining that the probability that the image represents the authentic instance of the document meets the threshold, providing, to a user, an indication that the instance of the document is authentic; and based on determining that the probability that the image represents the authentic instance of the document does not meet the threshold, providing, to the user, indications of one or more security features of the first plurality of security features associated with the first version of the document and instructions for authenticating the instance of the document using the one or more security features.

2. The system of claim 1, wherein the instructions further cause the one or more processors to perform operations comprising:
based on determining that the probability that the image represents the authentic instance of the document does not meet the threshold:
extracting, from the image, an identifier associated with the instance of the document;
comparing the identifier with a plurality of identifiers corresponding to a plurality of images associated with a plurality of instances of the document;
determining, based on the comparing, that the identifier matches a threshold number of instances of the document; and
based on determining that the identifier matches the threshold number of instances of the document, determining that the instance of the document is not authentic.

3. The system of claim 1, wherein the instructions further cause the one or more processors to perform operations comprising:
based on determining that the probability that the image represents the authentic instance of the document does not meet the threshold:
extracting, from the image, an identifier associated with the instance of the document;
determining that the identifier matches a stored image of another instance of the document stored in a database, wherein the stored image is associated with a user location and a user time; and
based on determining that the user location or the user time is not within a time location threshold of a current time and a current location, determining that the instance of the document is not authentic.

4. The system of claim 1, wherein the instructions, when executed by the one or more processors, further cause the one or more processors to perform operations comprising:
receiving, from the machine learning model, one or more indications of one or more areas on the image that contributed to lowering the probability that the instance of the document is authentic; and
generating for display the image of the document with the one or more areas highlighted to the user.

5. A method for providing multi-tier machine learning model processing for document authenticity, the method comprising:
receiving an image representing an instance of a document,
wherein the document is associated with a plurality of versions of the document,
wherein the plurality of versions of the document include:
a first version associated with a first plurality of security features for authenticating the document, and
a second version associated with a second plurality of security features for authenticating, and
wherein the second plurality of security features are different from the first plurality of security features;
inputting the image into a machine learning model,
wherein the machine learning model is trained to (1) determine, using a first tier of the machine learning model, a subset of the first plurality of security features which the instance of the document includes, (2) adjust parameters of a second tier of the machine learning model based on the subset of the first plurality of security features, and (3) determine, using the second tier of the machine learning model, whether the received image represents an authentic document;
receiving, from the machine learning model and based on inputting the image, a probability that the image represents an authentic instance of the document;
determining whether the probability that the image represents the authentic instance of the document meets a threshold; and
based on determining that the probability that the image represents the authentic instance of the document meets the threshold, providing, to a user, an indication that the instance of the document is authentic.

6. The method of claim 5, further comprising, based on determining that the probability that the image represents the authentic instance of the document does not meet the threshold, providing, to the user, indications of one or more security features of the first plurality of security features associated with the first version of the document and instructions for authenticating the instance of the document using the one or more security features.

7. The method of claim 6, further comprising:
receiving an input from the user that the document is authentic; and
based on receiving the input, initiating a training routine of the machine learning model, wherein the initiating comprises inputting the image into the machine learning model with a label indicating that the document is authentic.

8. The method of claim 5, wherein the machine learning model is configured to perform operations comprising:
identifying that the first version is associated with the instance of the document; and
based on the first plurality of security features being associated with the first version, determining the probability that the instance of the document is authentic.

9. The method of claim 5, further comprising:
based on determining that the probability that the image represents the authentic instance of the document does not meet the threshold:
accessing an identifier associated with the instance of the document;
comparing the identifier with a plurality of identifiers corresponding to a plurality of images associated with a plurality of instances of the document;
determining, based on the comparing, that the identifier matches a threshold number of instances of the document; and
based on determining that the identifier matches the threshold number of instances of the document, determining that the instance of the document is not authentic.

10. The method of claim 5, further comprising:
based on determining that the probability that the image represents the authentic instance of the document does not meet the threshold:
generating, from the image, a token representing the instance of the document;
determining that the token matches a stored token representing another instance of the document, wherein the stored token is associated with a detection location and a detection time; and
based on determining that the detection location is not within a location threshold of a current location or the detection time is not within a time threshold of a current time, determining that the instance of the document is not authentic.

11. The method of claim 10, further comprising updating a record associated with the token to indicate a detected location and detected time associated with detection of the token.

12. The method of claim 5, further comprising:
receiving, from the machine learning model, one or more indications of one or more areas on the image that contributed to lowering the probability that the instance of the document is authentic; and
generating for display the image of the document with the one or more areas highlighted to the user.

13. A non-transitory, computer-readable medium for providing multi-tier machine learning model processing for document authenticity, storing instructions that, when executed by one or more processors, cause the one or more processors to perform operations comprising:
receiving an image representing an instance of a document,
wherein the document is associated with a plurality of versions of the document,
wherein the plurality of versions of the document include:
a first version associated with a first plurality of security features for authenticating the document, and
a second version associated with a second plurality of security features for authenticating, and
wherein the second plurality of security features are different from the first plurality of security features;
inputting the image into a machine learning model,
wherein the machine learning model is trained to (1) determine, using a first tier of the machine learning model, a subset of the first plurality of security features which the instance of the document includes, (2) adjust parameters of a second tier of the machine learning model based on the subset of the first plurality of security features, and (3) determine, using the second tier of the machine learning model, whether the received image represents an authentic document;
receiving, from the machine learning model and based on inputting the image, a probability that the image represents an authentic instance of the document;
determining whether the probability that the image represents the authentic instance of the document meets a threshold; and
based on determining that the probability that the image represents the authentic instance of the document meets the threshold, providing, to a user, an indication that the instance of the document is authentic.

14. The non-transitory, computer-readable medium of claim 13, wherein the instructions further cause the one or more processors to perform operations comprising, based on determining that the probability that the image represents the authentic instance of the document does not meet the threshold, providing, to the user, indications of one or more security features of the first plurality of security features associated with the first version of the document and instructions for authenticating the instance of the document using the one or more security features.

15. The non-transitory, computer-readable medium of claim 14, wherein the instructions further cause the one or more processors to perform operations comprising:
receiving an input from the user that the document is authentic; and
based on receiving the input, initiating a training routine of the machine learning model, wherein the initiating comprises inputting the image into the machine learning model with a label indicating that the document is authentic.

16. The non-transitory, computer-readable medium of claim 13, wherein the machine learning model is configured to perform operations comprising:
identifying that the first version is associated with the instance of the document; and
based on the first plurality of security features being associated with the first version, determining the probability that the instance of the document is authentic.

17. The non-transitory, computer-readable medium of claim 13, wherein the instructions further cause the one or more processors to perform operations comprising:
based on determining that the probability that the image represents the authentic instance of the document does not meet the threshold:
accessing an identifier associated with the instance of the document;
comparing the identifier with a plurality of identifiers corresponding to a plurality of images associated with a plurality of instances of the document;
determining, based on the comparing, that the identifier matches a threshold number of instances of the document; and
based on determining that the identifier matches the threshold number of instances of the document, determining that the instance of the document is not authentic.

18. The non-transitory, computer-readable medium of claim 13, wherein the instructions further cause the one or more processors to perform operations comprising:
based on determining that the probability that the image represents the authentic instance of the document does not meet the threshold:
generating, from the image, a token representing the instance of the document;
determining that the token matches a stored token representing another instance of the document, wherein the stored token is associated with a detection location and a detection time; and
based on determining that the detection location is not within a location threshold of a current location or the detection time is not within a time threshold of a current time, determining that the instance of the document is not authentic.

19. The non-transitory, computer-readable medium of claim 18, wherein the instructions further cause the one or more processors to perform operations comprising updating a record associated with the token to indicate a detected location and detected time associated with detection of the token.

20. The non-transitory, computer-readable medium of claim 13, wherein the instructions further cause the one or more processors to perform operations comprising:
- receiving, from the machine learning model, one or more indications of one or more areas on the image that contributed to lowering the probability that the instance of the document is authentic; and
- generating for display the image of the document with the one or more areas highlighted to the user.

\* \* \* \* \*